United States Patent
Dryer et al.

(10) Patent No.: US 6,674,844 B1
(45) Date of Patent: Jan. 6, 2004

(54) SYSTEM FOR PROVIDING MODEM ACCESS VIA AN IR INTERFACE IN A PBX

(75) Inventors: Paul Dryer, Andover, MA (US); Michael S. McCormack, Gloucester, MA (US); Steve Weeks, N. Andover, MA (US)

(73) Assignee: 3Com Corporation, Santa Clara, CA (US)

( * ) Notice: Subject to any disclaimer, the term of this patent is extended or adjusted under 35 U.S.C. 154(b) by 273 days.

(21) Appl. No.: 09/883,892

(22) Filed: Jun. 18, 2001

(51) Int. Cl.[7] ............................................. H04M 11/00
(52) U.S. Cl. ................. 379/93.05; 379/90.01; 379/167.01; 379/399.01; 359/152
(58) Field of Search ........................ 379/90.01, 93.01, 379/93.05–93.08, 93.14, 93.15, 156, 167.01, 399.01, 413.02, 56.3; 359/152

(56) References Cited

U.S. PATENT DOCUMENTS 6,144,724 A * 11/2000 Stovall .................... 379/93.05
6,501,576 B1 * 12/2002 Seacombe ................. 359/152

FOREIGN PATENT DOCUMENTS

| EP | 0790749 | * | 8/1997 |
| GB | 2300322 | * | 10/1996 |
| JP | 10-56674 | * | 2/1998 |
| JP | 11-150507 | * | 6/1999 |
| JP | 11-186967 | * | 7/1999 |

* cited by examiner

Primary Examiner—Wing Chan
(74) Attorney, Agent, or Firm—McGlew and Tuttle, P.C.

(57) ABSTRACT

A telephone set of a telephone system is provided with an infrared interface. This infrared interface is able to communicate with an infrared port on a local computer. The computer is configured to send data to the infrared port, and receive data from the infrared port, in the same manner as if the computer was sending and receiving data over a telephone system. The telephone circuitry in the telephone system receives the infrared data and converts the infrared data into a format for transmitting across the telephone system.

17 Claims, 4 Drawing Sheets

SYSTEM FOR PROVIDING MODEM ACCESS VIA AN IR INTERFACE IN A PBX

FIELD OF THE INVENTION

The present invention relates to telephone systems, and in particular to computer communications over telephone systems.

BACKGROUND OF THE INVENTION

Telephone systems were initially, and are now predominantly analog systems. Computers are practically by definition digital devices. In order to transfer data from one computer to another computer using an analog telephone system, the digital signals from the computer are converted into analog signals that are transferable over an analog telephone system. The device for converting the digital and analog signals is known as a modem.

As computers have evolved, new ways of communicating between computers has also evolved. One new way of computer communication is by infrared (IR) electromagnetic waves. Infrared communication has features that are advantageous in specific circumstances. Infrared communication does not require the connection of electrical cables, but is disadvantageous because it requires a line of sight between the transmitter and receiver, and infrared communication requires relatively close distances between the transmitter and receiver. Infrared communication is often used in notebook computers for communicating with a docking station or another notebook computer, or other handheld computing devices. Infrared communication is desirable in these circumstances because the units are usually very close together, and no physical cable needs to be provided or connected. However for long distances computer communications, physical electrical cables are preferred.

SUMMARY AND OBJECTS OF THE INVENTION

It is a primary object of the present invention to provide a telephone system that can be easily connected to a computer for long distance computer communications.

The present invention accomplishes this object by providing a telephone set of a telephone system with an infrared interface. This infrared interface is able to communicate with an infrared port on the computer. The computer is configured to send data to the infrared port, and receive data from the infrared port, in the same manner as if the computer was sending and receiving data over a telephone system. The telephone circuitry in the telephone system receives the infrared data and converts the infrared data into a format for transmitting across the telephone system.

In a preferred embodiment, the computer is configured to use the infrared port as it would use a serial port with an external modem. The telephone circuitry in the telephone system operates as an external modem receiving serial data via the infrared interface. This is very convenient especially for portable computers which need a temporary long distance communication connection. The infrared port of the computer only needs to be arranged within a line of sight of the infrared interface of a telephone set of the present invention. The local computer does not require any other physical connections or structures. The software in the local computer can be easily configured to use the infrared port as a serial connection with an external modem. Many operating systems for computers, especially personal computers, can be automatically configured when devices are added. The infrared interface on the telephone set could be programmed to emit a modem identifying signal, and the local computer could automatically recognize that a modem is available through the infrared port. In the alternative, the local computer could be specifically told that an external modem is present through the infrared port. The exact configuration of the local computer to use the infrared port as a serial connection to an external modem depends on the type of operating system used by the local computer and is within the ability of those persons skilled in the art of computer operating systems.

The local computer can then be easily removed from a position for long distance communication and moved to another position according to the needs of the local computer user. The connection and disconnection of electrical cables is therefore eliminated.

Also the need for a modem in the local computer is also eliminated. This is very advantageous because the cost, weight, volume and power consumption of a modem is also eliminated. The infrared port of the local computer is able to perform two functions which makes the infrared port more valuable.

A more important benefit of using the IR port to connect to a telephone system is that the specific structure required for the signal conversion resides in the telephone circuitry of the telephone system. There are many different types of telephone systems, and many with their own signal format. Probably the largest and most common is known as the Public Switched Telephone Network (PSTN). This is the telephone systems that connects the individual residences and businesses in a community. As described previously, this system is predominantly analog and requires a modem to be able to transfer computer data. New digital services are being provided by the PSTN, such as DSL and ISDN. These new digital services do not require an analog modem, but instead require a different type of converter. Furthermore, many organizations had their own private telephone system for communicating within the organization, and between the organization and the PSTN. These private telephone systems are known as Private Branch eXchanges (PBX). There are many different types of PBX's available, with many different types of signal formats for transferring the voice data between the telephone sets of the PBX.

For a computer to communicate over a telephone system, it is necessary for the computer to know what type of signal format the telephone system is using. With all the different types of signal formats, such as PSTN analog, DSL, ISDN, and the individual proprietary formats for PBX's, having a computer/telephone converter for all of the possible signal formats is prohibitively expensive. Very often an organization will run a PSTN analog line separate from the PBX lines in order to provide a computer with long distance communication.

With the present invention, the telephone set inherently knows the signal format of the telephone system to which it is connected. Therefore the telephone circuitry only needs to provide one computer/telephone converter. This in combination with the local computer only requiring an infrared port, is a great reduction in cost and a great increase in versatility. The user of the local computer no longer needs to determine the signal format of the telephone system and then try to obtain the proper computer/telephone converter. The computer/telephone converter is built into the telephone circuitry of the telephone system. The computer user can then easily and quickly connect to any telephone system using the present invention.

When the present invention is incorporated into a PBX which is connected to a PSTN, the telephone set has a converter for converting the data from the infrared interface into the signal format of the PBX. The telephone set also directs this computer data to the PBX hub for connection to the PSTN. The PBX hub then has another converter for converting from the PBX format to the PSTN format. This type of converter is similar to a modem.

A PBX can also be used to connect a plurality of computers in an organization to form a Local Area Network (LAN). This is described in U.S. patent application Ser. No. 09/203,542 filed Dec. 1, 1998. This is known as a PBX/LAN network, and can also take advantage of the present invention. In a further embodiment of the present invention, the infrared interface of the telephone set can receive data from the local computer for transmission to the other computers on the LAN. The telephone set can either be manually switched to send data from the IR interface to the modem in the PBX hub, or to send data from the IR interface to the LAN. The local computer is also either manually or automatically switched to transfer modem data or LAN data through the IR port. This is especially useful for members of the organization which use portable computers and need to repetitively connect and disconnect from the LAN of the organization. These highly mobile members of the organization can rapidly connect and disconnect from the LAN, and can also rapidly connect and disconnect from the PSTN. These uses also do not need to only connect at one particular location, but the IR interface of the telephone sets allows these uses to connect wherever an IR telephone set is present. The mobility and versatility of computers and the PBX/LAN network is increased and allows an organization greater opportunities.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
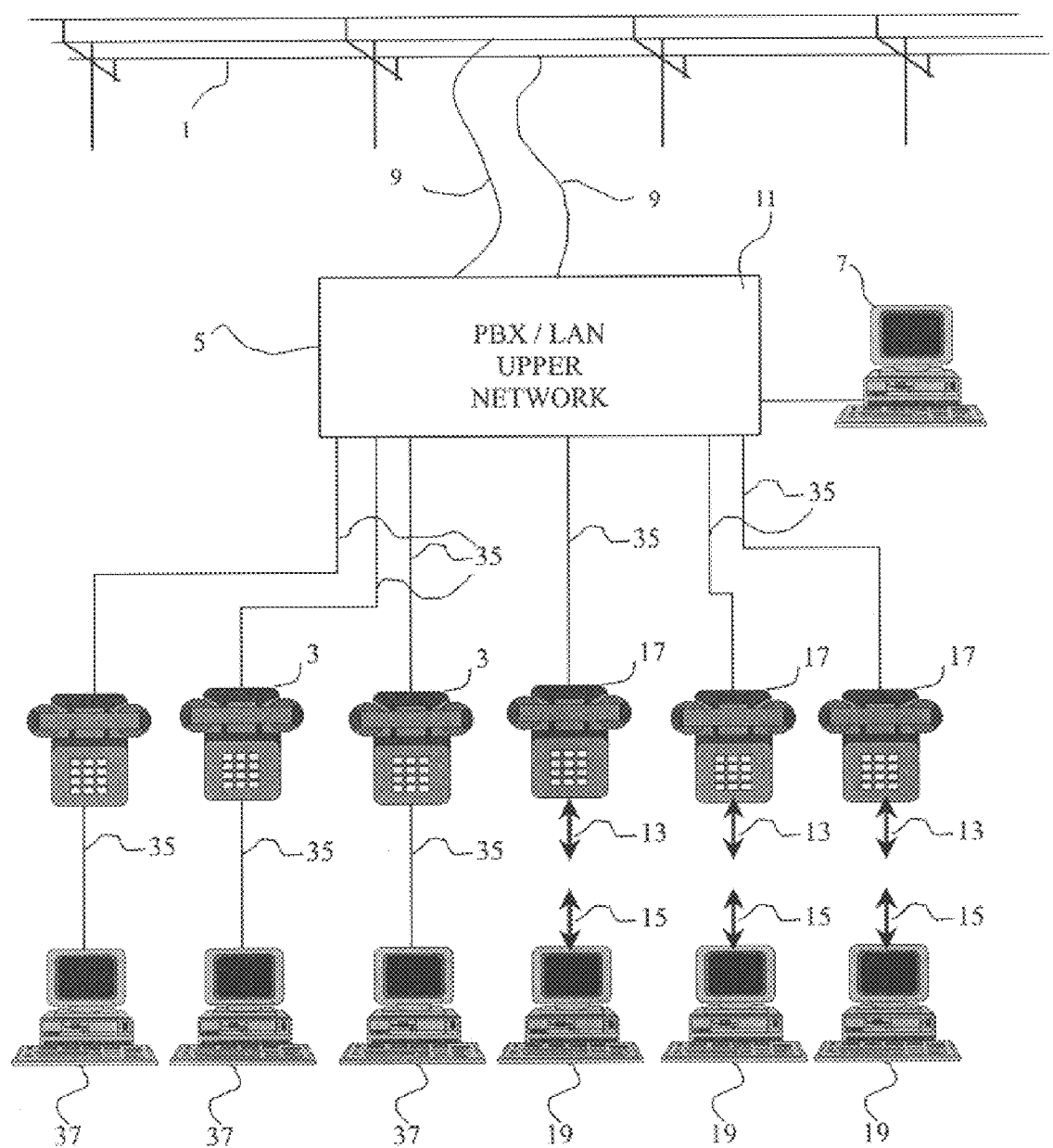
FIG. 1 is a schematic view of a PBX/LAN network connected to a PSTN.

Referring to be drawings, and in particular to FIG. 1, the present invention is incorporated into a PBX telephone system which connects to an external telephone complex, such as a PSTN. A plurality of individual PBX phones 3 are connected to a PBX upper network 5 preferably a PBX/LAN upper network. The PBX upper network 5 controls how the individual phones 3 communicate with the PSTN 1 and how the individual PBX phones 3 communicate between themselves. A system workstation 7 allows an operator to program the PBX upper network 5 and monitor the status of the PBX upper network 5. The PBX phones 3 are connected to the PBX upper network 5 by wires or lines 35. Individual workstations 37 can be connected to the PBX phones 3 if the PBX upper network 5 is a PBX/LAN network.

According to the present invention infrared phones 17 include an infrared interface 13 which send and receive infrared signals from and to an infrared capable local computer 19. The local computer 19 includes an infrared port 15 for communicating with the infrared interface 13.

When a local computer 19 has modem data or wishes to communicate over the PSTN, the local computer sends the modem data to the IR port 15. The local computer 19 treats the IR port 15 as a serial port with an external modem. The local computer 19 is positioned so that the infrared port 15 can transmit and receive infrared signals with the infrared interface 13.

Figure 2:
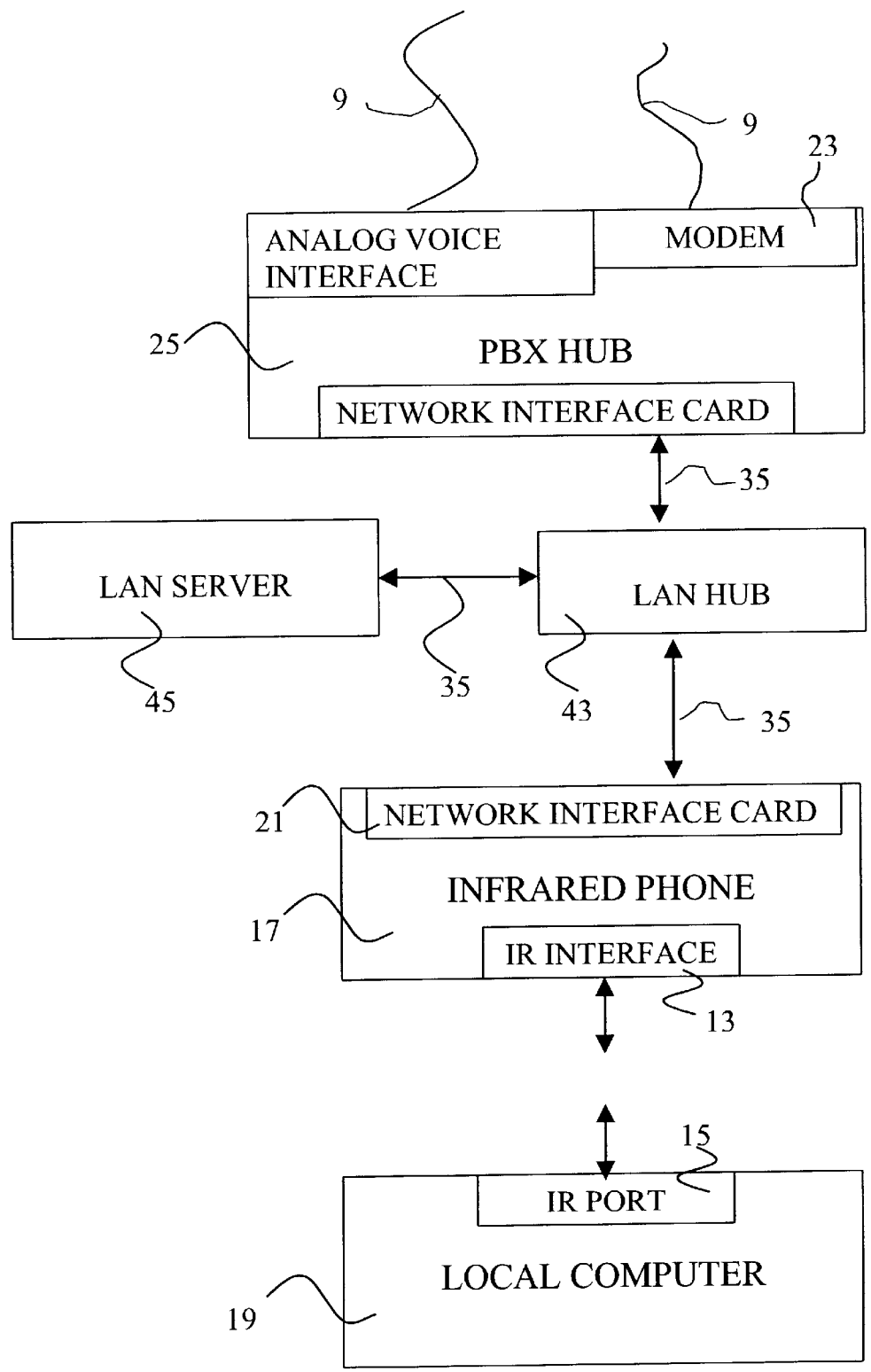
FIG. 2 is a block diagram of the data flow in the present invention.

In the preferred embodiment, the infrared phone is part of a PBX/LAN system as shown in FIG. 2. If the infrared phone 17 were directly connected to a PSTN system, the infrared phones 17 would have a modem for converting computer data directly into PSTN signal format.

In the preferred embodiment, the PBX system uses a LAN type signal format to communicate with the other PBX phones and with the PSTN system. The infrared phone 17 therefore contains a network interface card 21 for connecting to the network lines 35. The infrared phone 17 converts the data from the IR interface 13 into the proper format for the PBX/LAN system so that this data is transferred to the modem 23 in the PBX hub 25. The modem 23 in PBX hub 25 converts the data from the LAN type format into PSTN format. The modem 23 is connected to the PSTN via lines 9. The local computer 19 is thus able to communicate with the PSTN through the PBX system and through any intermediate network devices such as a LAN hub 43. The PBX system does not need to be a PBX/LAN system, but can be any PBX system where the infrared phone 17 converts the infrared data into the required PBX format and sends it to a modem 23 in the PBX hub 25. The modem 23 must then convert from the PBX format to the PSTN format. The modem 23, the PBX hub 25, and the infrared phone 17 operate similarly in the reverse direction. The local computer 19 does not need to know the specific PBX signal format and does not need a modem for any specific telephone system. The present invention also does not require the local computer to use an electrical cable. The connection through the telephone set and the PBX hub is completely transparent to the local computer 19.

Figure 3:
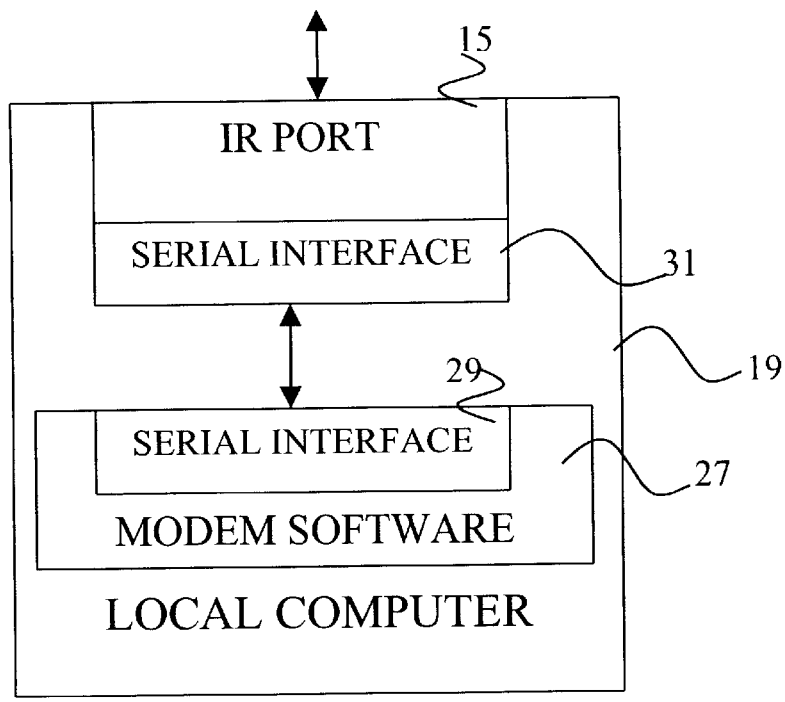
FIG. 3 is a block diagram of the modules inside the local computer used for transferring modem data.
Figure 4:
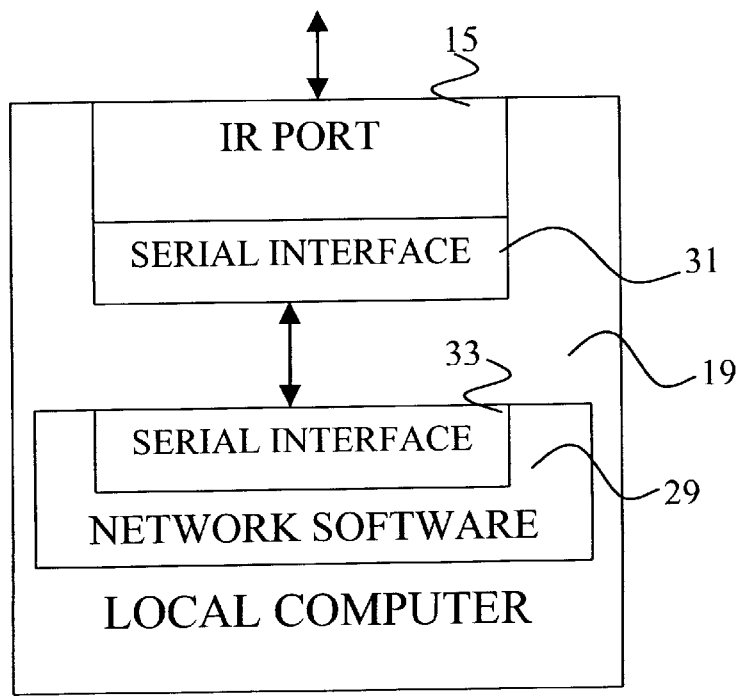
FIG. 4 is a block diagram of the modules inside the local computer used for transferring LAN data.

FIG. 3 shows how the local computer 19 communicates with the infrared port 15. The local computer 19 has modem software which is standard and known. This modem software 27 communicates to a serial interface 29 in the usual fashion. The serial interface 29 of the modem software 27 is configured to connect to a serial interface 31 of the IR port 15. Most computers and operating systems presently available are readily configurable to make this connection. The modem 23 and the modem software 27 communicate back and forth through the PBX system according to standard computer operating procedures for an external modem.

In the preferred embodiment, the PBX system is a PBX/LAN system where telephones 3, 17 and workstations 37 communicate over the same lines and to many of the same network devices. If the local computer 19 desires to communicate with the other workstations 37 in the PBX/LAN system, the local computer 19 contains network software 29. The network software 29 has a serial interface 33 which communicates with the serial interface 31 of the infrared port 15. Network data is then send from the local computer 19, to the network software 29, then to the IR port 15 where this network data is then received by the IR interface 13 in the IR phone 17.

Figure 5:
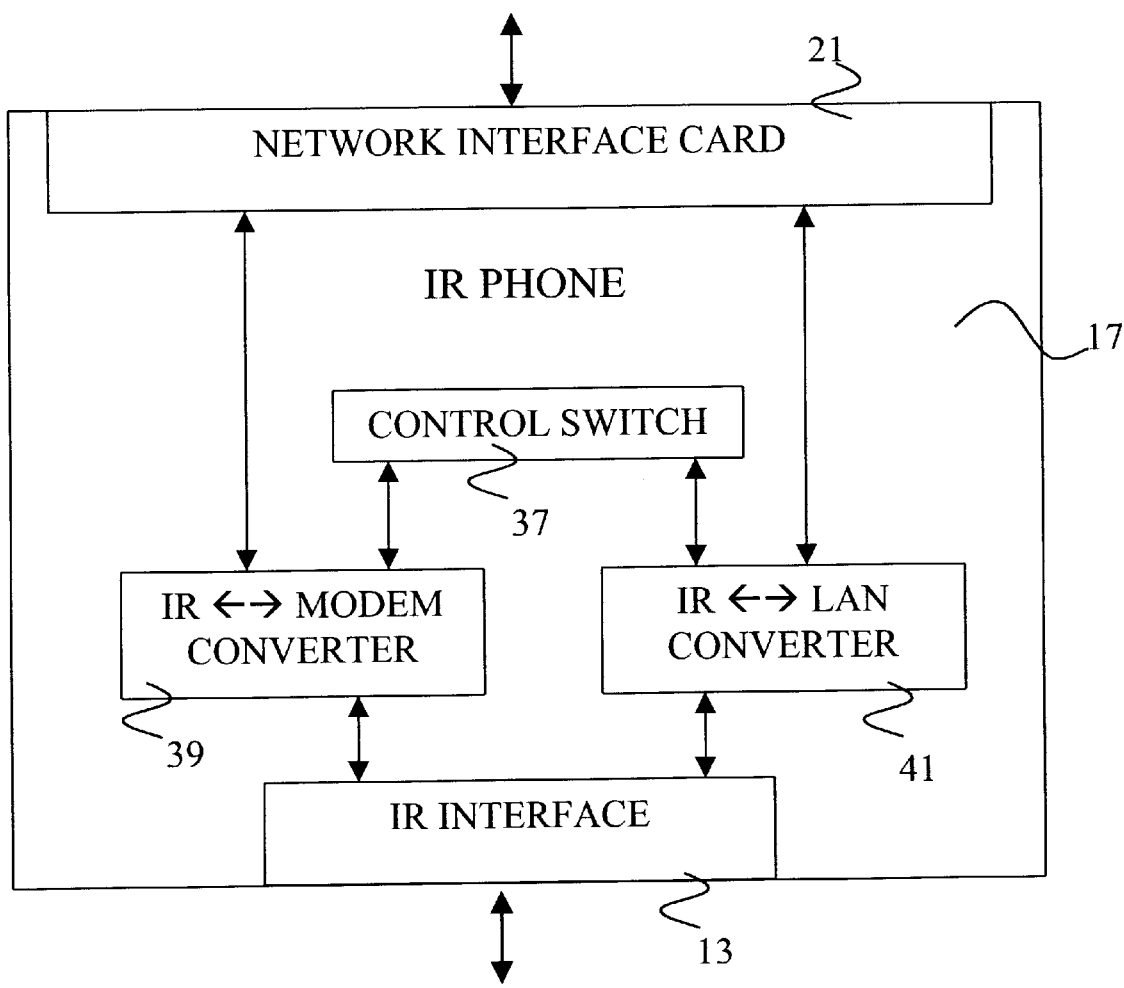
FIG. 5 is a block diagram of the modules inside the telephone set.

The IR phone 17 can handle both modem and LAN data as shown in FIG. 5. When the IR interface 13 receives the data from the local computer 19, the IR phone 17 needs to determine whether the data from the IR interface 13 is modem data or LAN data. The IR phone 17 can be manually switched through a control switch 37 to accept modem data or LAN data. In the alternative, control switch 37 can detect automatically the type of data been received by the IR interface 13. If modem data is being received through the IR interface 13, IR-modem converter 39 is used to convert and transfer the data from the IR interface 13 to the network interface card 21. The IR-modem converter configures the data so that it will be sent to the modem 23 in the PBX hub 25.

If the control switch 37 indicates that LAN data is being received, IR-LAN converter 41 is used to convert the LAN data in the proper PBX format, and direct this data to the proper workstations 37, a LAN server 45, or other local computer 19.

Local computers 19, especially portable computers such as laptops, notebooks and hand-helds can be easily connected to a PSTN system, even through a PBX system of unknown signal format. The local computer can also be connected to other workstations through a PBX/LAN system. The versatility, and therefore the value, of portable computers and their users, are increased by the present invention.

While specific embodiments of the invention have been shown and described in detail to illustrate the application of the principles of the invention, it will be understood that the invention may be embodied otherwise without departing from such principles.

What is claimed is:

1. A telephone system comprising:
   a Local Area Network (LAN) operating a computer network protocol;
   a Private Branch Exchange (PBX) arranged in said LAN;
   a plurality of telephone sets connected to said LAN, each of said telephone sets including telephone circuitry for telephonically connecting one telephone user with another telephone user over said LAN using said computer network protocol;
   an infrared interface arranged in each of said telephone sets for infrared communication with a local computer device having an infrared port, said infrared interface transferring LAN data between the local computer device and said LAN using said computer network protocol.

2. A system in accordance with claim 1, wherein:
   said infrared interface transfers the LAN data directly between the local computer and said LAN bypassing said telephone circuitry.

3. A system in accordance with claim 1, wherein:
   said infrared interface also receives modem data from the local computer and configures the modem data to be sent telephonically from said telephone set to said LAN in said computer network protocol.

4. A system in accordance with claim 1, further comprising:
   a plurality of computer devices connected to said LAN and communicating with each other over said LAN according to said computer network protocol.

5. A method for operating a telephone network, the method comprising the steps of:
   providing a Private Branch Exchange (PBX)/Local Area Network (LAN) with a plurality of telephone sets and operating a computer network protocol, said telephone sets having an infrared interface;
   providing a plurality of computer devices connected to said PBX/LAN, said plurality of computer devices communicating with each other over said PBX/LAN according to said computer network protocol;
   transferring telephone data telephonically between the telephone sets over said PBX/LAN using said computer network protocol;
   receiving LAN data from a local one of said plurality of computer devices at one of said infrared interfaces;
   transferring said LAN data over said PBX/LAN to another one of said plurality of computer devices.

6. A method in accordance with claim 5, further comprising:
   connecting a PSTN interface unit with said PBX/LAN;
   receiving telephone data from said local one of said plurality of computer device at said one of said infrared interfaces;
   transferring said telephone data telephonically from said one infrared interface through said telephone and said PBX/LAN to said PSTN interface unit of said PBX/LAN.

7. A method in accordance with claim 5, further comprising:
   said plurality of computer devices communicating with each other over said PBX/LAN separately from said telephone data transferred telephonically over said PBX/LAN.

8. A method in accordance with claim 6, further comprising:
   said plurality of computer devices communicating with each other over said PBX/LAN separately from said telephone data transferred telephonically over said PBX/LAN.

9. A telephone system comprising:
   a telephone line connection for connecting to a telephone network, said telephone line connection is incorporated into a PSTN interface unit of Private Branch Exchange (PBX);
   a telephone set connected to said telephone line connection and including telephone circuitry for telephonically conning one telephone user with another telephone user over the telephone network;
   a PBX network connecting said telephone set with said PSTN interface unit said PBX network uses a computer network protocol to communicated between said PSTN interface unit and said telephone set;
   an infrared interface connected to said telephone set for infrared communicating with a local computer device having an infrared port said infrared interface transferring data between the local computer device and said telephone circuitry, said infrared interface detects Local Area Network (LAN) data from the local computer and configures the LAN data to be sent from said telephone set to computer network devices connected to said PBX network;

a modem unit is arranged in said PSTN interface unit and connected to said telephone line connection, said modem unit converts the data from the local computer device received through said PBX network into PSTN signals, and converts PSTN signals from the telephone network into the data for the local computer device.

10. A system in accordance with claim 9, wherein:

said PBX network uses an Ethernet protocol to communicated between said PSTN interface unit and said telephone set;

said PBX network connects a plurality of said telephone sets and computer workstations with each other using said Ethernet protocol.

11. A system in accordance with claim 9, wherein:

said telephone set includes a speaker and microphone for audio communication of the operator.

12. A system in accordance with claim 9, wherein:

said infrared interface communicates with the IR port of the local computer according to a serial port protocol.

13. A system in accordance with claim 9, wherein:

said infrared interface detects modem data from the local computer and configures the modem data to be sent from said telephone set to said modem in said PSTN interface unit.

14. A system in accordance with claim 9, wherein:

a plurality of said telephone sets and computer workstations communicate with each other over said PBX network using said computer network protocol.

15. A system in accordance with claim 9, wherein:

said PBX network uses an Ethernet protocol to communicated between said PSTN interface unit and said telephone set.

16. A system in accordance with claim 9, wherein:

said telephone set includes a network interface card connected between said infrared interface and said PBX network.

17. A system in accordance with claim 9, wherein:

the local computer communicates with the IR port according to a serial port protocol with an external modem.

\* \* \* \* \*